Dec. 31, 1968  F. W. DOWDICAN ET AL  3,418,936
PUMP

Filed Dec. 5, 1966  Sheet 1 of 2

INVENTORS.
FRANKLIN W. DOWDICAN
HARRY R. ASCHAN

INVENTORS.
FRANKLIN W. DOWDICAN
HARRY R. ASCHAN

United States Patent Office 3,418,936
Patented Dec. 31, 1968

3,418,936
PUMP
Franklin W. Dowdican, Rte. 1, Talala, Okla. 74080, and
Harry R. Aschan, 2547 E. 18th St., Tulsa, Okla. 74104
Filed Dec. 5, 1966, Ser. No. 599,121
4 Claims. (Cl. 103—25)

ABSTRACT OF THE DISCLOSURE

An electric-driven pump is disclosed. The electric motor and switch between the motor and power source are in separate compartments of the same housing, separated by a flexible wall. The switch is normally actuated automatically by the head of liquid to be pumped but can be manually actuated by a lanyard.

BACKGROUND OF THE INVENTION

Field of the invention

The present invention relates to venting compartments which have cyclic pressures generated within them. More particularly, the invention relates to the relief of pressure in the compartment of a motor operated periodically while maintaining the compartment isolated from external moisture. Additionally, the invention relates to manual actuation of the motor switch from a remote station.

Description of the prior art

Air-cooled electric motors for pumps are common. Also, it is known to vent the compartments of air-cooled motors directly to atmosphere to relieve the pressure which is generated by the heat of these motors when they operate. The cooling of the motor compartment when the motor is stopped draws moisture-laden air to the motor windings with eventual damage.

Complete sealing of the motor compartments from ambient liquids has been attempted, but eventually the cyclic pressure of thermal development by motor operation breaks down any practical sealing structure of the compartment. When it has been required to manually actuate motors beneath liquid to be pumped, a switch has been mounted near the power source and the connections conducted to the head-operated switch in its compartment in the pump housing. The location of the manual switch at one station and the automatic switch at the pump housing is an awkward and clumsy design.

SUMMARY OF THE INVENTION

The present invention contemplates a pump housing with the motor in a first compartment and the automatic and manual switches in a second compartment, the two compartments separated by a flexible wall. The switch compartment is vented to the atmosphere through a tube included in the bundle of power leads to the source. A lanyard is extended down this vent tube for manual actuation of the switch mechanism from a remote station along the power leads. The motor compartment is filled with selected liquid about the motor for added protection and isolated by the flexible wall from the switch compartment with its connected vent tube.

DESCRIPTION OF THE PREFERRED EMBODIMENT

General pump arrangement and operation

Figure 1:
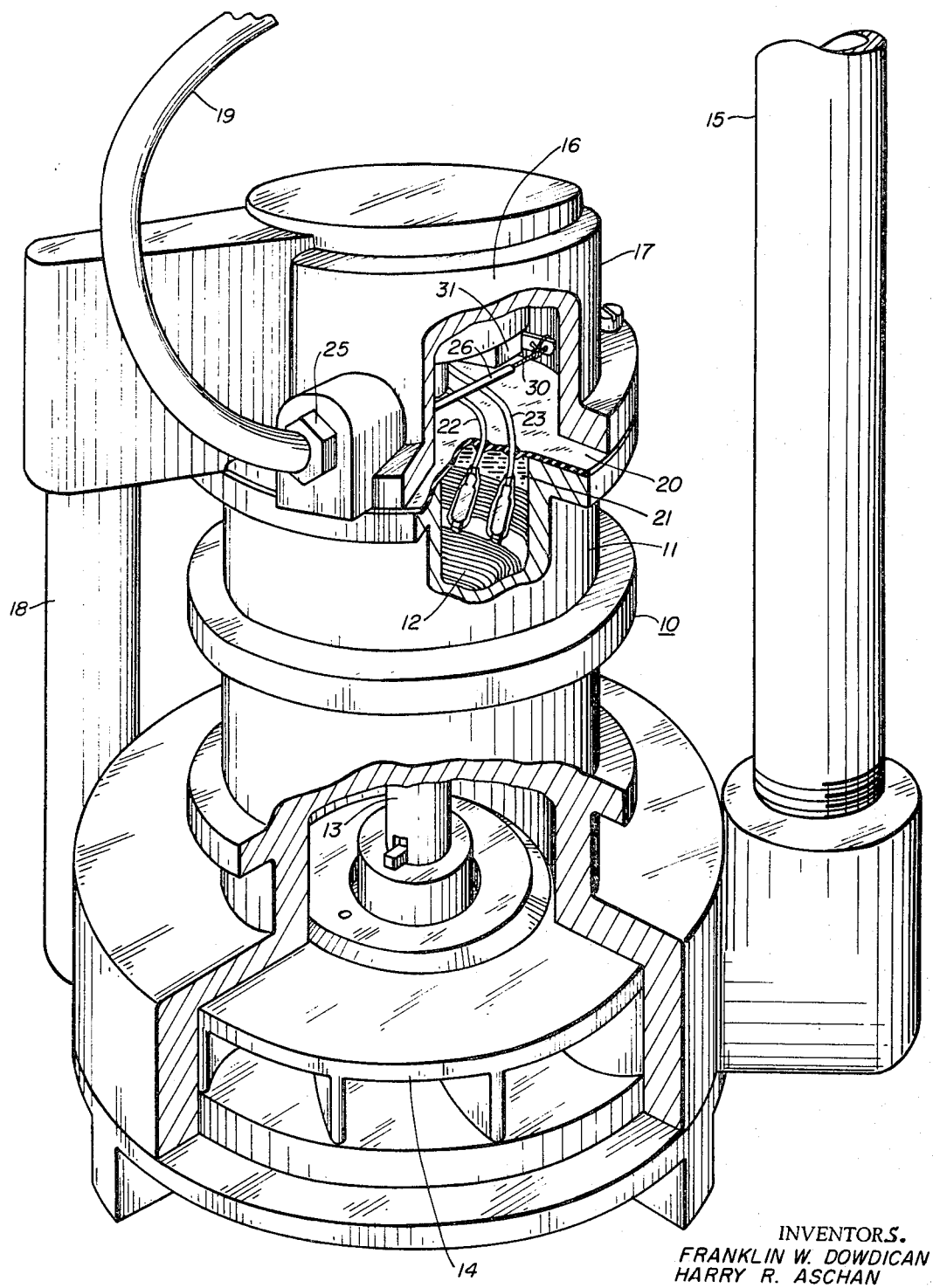
FIG. 1 is a partially sectioned isometric view of a pump in which the present invention is embodied.

Referring to FIG. 1, a complete sump pump is disclosed. The pump includes a casing 10 within, and on which, the various components of the mechanism are mounted. A first compartment 11 is sectioned to disclose electric motor 12 mounted therein. When connected to a source of electric power, motor 12 rotates a shaft 13 on which impeller 14 is mounted. Rotated by the motor, impeller 14 forces liquid of the sump up discharge pipe 15.

The motor is automatically connected to a power source through switch mechanism 16 mounted in a second compartment 17. The switch is actuated automatically when the hydraulic head of the liquid collection in the sump reaches a predetermined value. Pipe 18 is not completely shown in the drawing. However, this pipe transmits the pressure of the hydraulic head to the switch in the second compartment.

A manual switch is provided for arbitrarily actuating the pump. Otherwise, the pump turns on automatically in response to the head of liquid to be pumped. FIG. 1 discloses the necessary connection cable bundle 19 which extends from a source not shown into the second compartment through a liquid-tight seal. The pump is normally immersed in the liquid it pumps and this moisture must not be permitted to reach either the switch mechanism nor the motor. Either structure would be rapidly deteriorated by the types of liquid normally pumped.

The seal problem of the motor compartment

The motors of sump pumps are operated on rather frequent cycles. Once the impeller lowers the level of liquid to be pumped to a predetermined level, the electric motor is disconnected from the source of power. Heat is generated when the motor operates; this heat is dissipated when the motor is stopped. The thermal cycle within the compartment of an air-cooled motor is quite significant. The result would be a large swing in pressure if the motor compartment were sealed.

Sump pump fabricators have tried to seal their motor compartments. The cyclic strain of the pressure across the seals can cause excessive seal leakage. There are several detrimental results of sump liquid reaching the motor structure. Further, it has proven impractical to build a seal strong enough to withstand this cyclic strain.

Some sump pump fabricators have directly vented their motor compartments to atmosphere in order to obviate pressure swings. The results of direct venting is to draw all manner of foreign material into the motor compartments during the cooling periods. Water vapor condensed from ambient air is representative of this material. The moisture is both corrosive and detrimental to the dielectric insulation characteristics of the motor.

This problem has been met by the present invention with a sealed motor compartment including a flexible wall. The external side of this flexible wall is directly vented to atmosphere, but the motor compartment remains sealed. Specifically, FIG. 1 discloses motor 12 mounted in compartment 11 which has diaphragm 20 of the compartment sealed between housing flanges. Venting the upper side of this wall to atmosphere prevents pressure cycles from placing a strain on the compartment seals. It is to be understood that flexible wall 20 is not limited in either material or shape. It could be sufficiently thin metal and could be a bellows rather than a diaphragm, as examples.

The problem is further reduced by filling the compartment 11 with liquid 21 about the motor 12. The liquid selected for this service must have at least three satisfactory characteristics. First, the liquid should have lubricating ability; the motor bearings come into contact with the liquid and must be kept lubricated. Second, the liquid should be capable of dissipating the heat generated by the motor; the motor heat should be conducted as quickly as possible to the walls of the motor compartment 11. Third, the liquid should have desirable dielectric characteristics for electrical insulation of the motor.

The conventional choice for the liquid about the motor is some form of oil. However, it is conceivable that a liquid could be developed with the required characteristics and not be technically classified as oil. In any event, we are selecting a liquid with certain characteristics for this service, regardless of what name is given it.

Still another characteristic of liquids is employed to advantage in this service. In general, the coefficient of thermal expansion of a liquid is considerably less than the volumetric changes of a gas following the fundamental gas laws. The specific result from the use of a liquid 21 in compartment 11 is less of a change in volume over the thermal cycles of operation of motor 12 than if an air-cooled motor were employed. Less change in volume for the medium filling compartment 11 about the motor means less stress upon the seals of compartment 11 and less movement of the flexible wall 20.

Electrical power leads 22 and 23 which are internally sealed to their insulation are disclosed as connecting switch mechanism 16 with motor 12 through diaphragm 20. It is a simple matter to form holes in diaphragm 20 for these leads which holes are slightly less in diameter than the outside diameter of leads 22 and 23. The leads are then pulled through the diaphragm holes and a sealing compound applied about the external surface of the leads and the diaphragm. The liquid-filled compartment 11 is then effectively sealed from the switch compartment 17 and the material introduced in compartment 17 by direct venting does not reach motor compartment 11.

It is to be understood that the invention is not to be limited in that the disclosure shows the leads going through the diaphragm. Conceivably, the leads could exit compartment 17 through any of its walls and enter compartment 11 through any of its walls. A fundamental concept remains, embodied in the two compartments separated by a flexible wall.

Venting switch compartment 17

Figure 2:
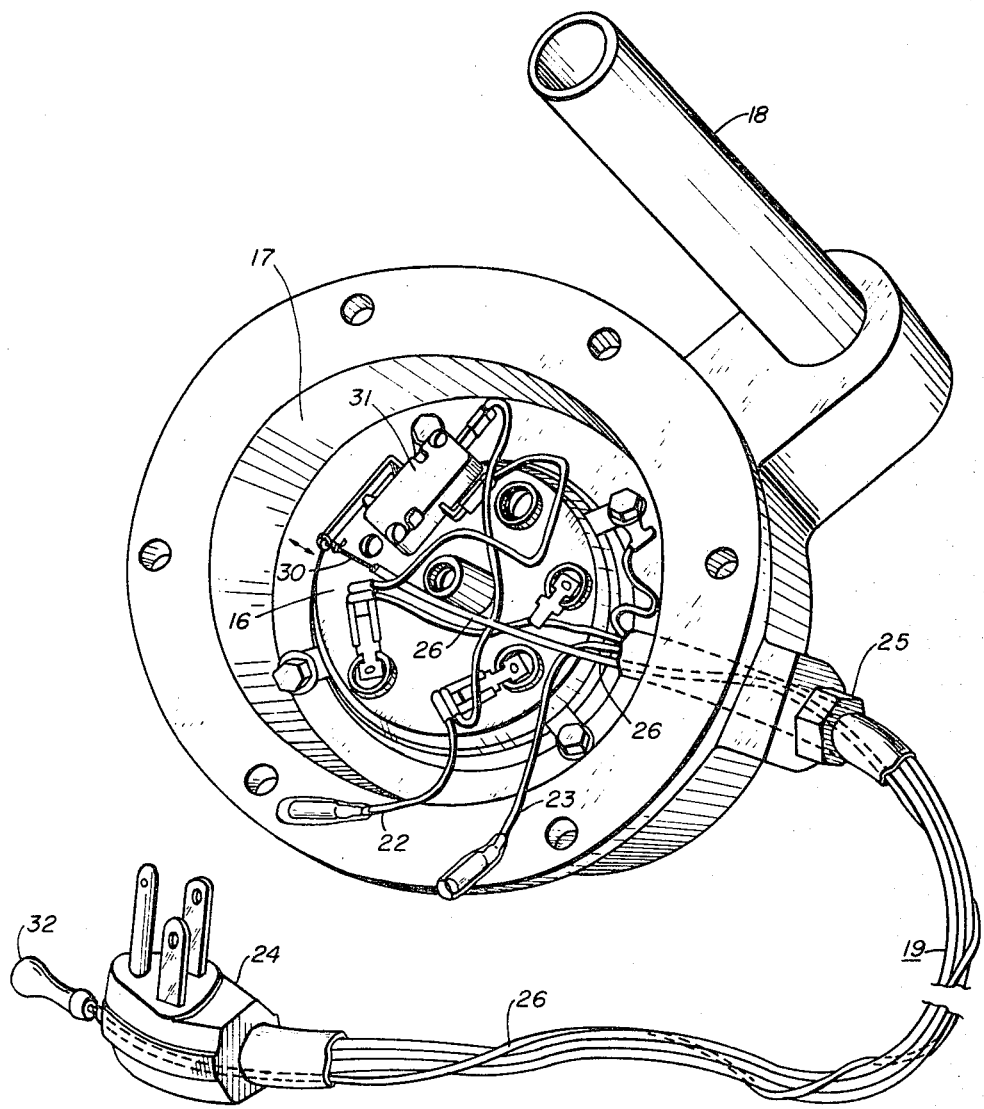
FIG. 2 is an isometric view of the switch compartment of the pump with the leads which extend between a power source and switch and actuating lanyard extending through a tube included with the leads.

FIG. 2 discloses the portion of housing 10 defining second compartment 17 removed from the remainder of the housing to more completely disclose the switch mechanism 16. Pipe 18 is shown as attached to the top of compartment 17 in order to communicate the head of liquid to be pumped to the mechanism 16. Cable bundle 19 is disclosed more completely, a plug 24 mounted on one end and the bundle sealed at its other end into compartment 17, through fitting 25.

When the pump is assembled, compartment 17 is sealed to compartment 11. However, communication is maintained to atmosphere, through tube 26. This tube, or conduit, is included in the bundle of electrical wires which extend from plug 24 to switch 16. The plug 24 is stationed remote from the liquids to be pumped, to connect with a power source, therefore, the external end of the tube is maintained in the atmosphere while directly venting compartment 17.

As indicated previously, the venting of compartment 17 in this fashion may result in moisture being brought to the switch mechanism 16. However, the structure of this switch can be made of materials which will withstand fairly severe corrosive conditions and remain operative over long periods of time. A primary object of the arrangement is accomplished, protection of the motor from detrimental conditions.

Manual actuation of switch mechanism 16

The present invention very clearly provides for the motor 12 to be actuated automatically. There is a need to periodically actuate the pump motor. When this need arises, it is desired to bypass the automatic mechanism responsive to the head of liquid to be pumped. The present invention provides a mechanical link extending from plug 24 to switch mechanism 16 with which power can be directly connected to motor 12.

In providing the mechanical link for manual actuation, tube 26 is used as a conducting means for the link. Therefore, tube 26 not only vents compartment 17 but provides a path for the link.

Figure 3:
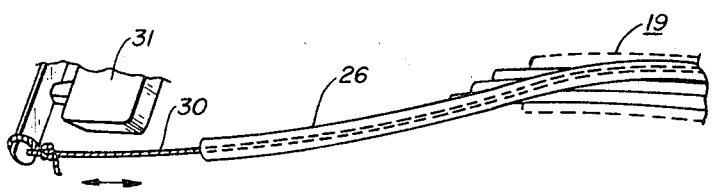
FIG. 3 is an isometric view of the connection between the switch and lanyard.

The link is specifically disclosed as a lanyard of flexible cord 30, arranged along the length of the tube 26 and beyond. FIGS. 2 and 3 are taken together to show how one end of lanyard 30 is connected to a bypass switch 31 and the opposite end is connected to a knob 32 at plug 24. The lanyard slides in tube 26 under manual control at the knob end. Enough movement is obtained at the switch end to activate bypass switch 31. Release of the lanyard enables a spring of bypass switch 31 to return the switch to its normally open position.

The construction and arrangement of lanyard 30 and tube 26 is by no means as obvious as a casual inspection of the drawing might lead one to believe. A particular selection of material is required to enable lanyard 30 to slide in tube 26 enough to perform its function.

To begin with, the more obviously satisfactory material for tube 26 is a plastic. Teflon is presently quite popular for this type of service. This material can be formed with a uniform bore and be spirallel satisfactorily within bundle 19.

Lanyard 30 offered the real challenge. The material of the lanyard sliding within tube 26 does not appear as important as the form for the material. The length to be considered is in the order of eight feet in a practical embodiment. A monofilament form of lanyard would not slide within the tube 26 readily enough to give the movement required for switch actuation. It was found that a multifilament form of cord will give satisfactory performance.

Also, placing the lanyard in tube 26 as a challenge. How do you draw the cord through the tube over the order of eight feet? The problem was solved by a combination of a lubricant on the cord and the force of gas pressure directed along the inside of the tube. The cord, forced by gas, is readily fed through the length of tube 26.

Finally, there is the lay, or twist, or spiral of the tube and lanyard within bundle 19. Obviously, a spiral too tight will bind the lanyard and prevent the required movement when knob 32 is pulled. There is a minimum length to each twist of the spiral which was discovered through exhaustive tests. The result of the selection of material, its construction and arrangement, in a switch-actuating movement at bypass switch 31 enables motor 12 to be turned on at will by manual pull of knob 32.

From the foregoing it will be seen that this invention is one well adapted to attain all of the ends and objects hereinabove set forth, together with other advantages which are obvious and which are inherent to the method and apparatus.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:
1. A pump, including,
    a housing for the motor and impeller and switch mechanism of the pump,
    a first compartment within the housing for the motor, the first compartment being filled with a liquid about the motor, which liquid lubricates the motor bearings and conducts heat from the motor to the walls of the compartment and maintains desirable dielectric characteristics for electrical insulation of the motor, a second compartment within the housing for the switch mechanism, which mechanism is arranged to connect the motor to a source of power to operate the motor, means for actuating the switch mechanism automatically by the head of liquid to be pumped, a flexible wall between the compartments and arranged to seal the liquid about the motor within the first compartment, and means connected to the second compartment for providing communication with the atmosphere for venting the second compartment to allow the liquid of the first compartment to increase and decrease in volume while the seal is maintained as the motor within the compartment periodically generates heat during the pump operation and subsequently cools when turned off.

2. The pump of claim 1 wherein,
a lanyard is included in the communication means and is connected to the switch mechanism by which the motor is manually operated.

3. The pump of claim 2 wherein,
the lanyard construction comprises multiple filaments.

4. The pump of claim 2 wherein,
the means connected to the second compartment for providing communication is a tube, and the lanyard is placed within this tube by lubricating the surface of the lanyard and directing the force of gas pressure on the lanyard along the inside of the tube.

References Cited

UNITED STATES PATENTS

| | | | |
|---|---|---|---|
| 2,611,061 | 9/1952 | Richardson | 200—161 |
| 2,682,229 | 6/1954 | Luenberger | 103—87 |
| 2,777,961 | 1/1957 | Penlington | 103—87 X |
| 2,910,524 | 10/1959 | Schaffhauser | 103—203 |
| 2,933,570 | 4/1960 | Tutthill | 103—25 |
| 2,917,611 | 12/1959 | Houston | 200—161 |
| 3,318,249 | 5/1967 | Loeser | 103—25 |

WILLIAM L. FREEH, *Primary Examiner.*

U.S. Cl. X.R.

200—161